United States Patent [19]

Weber et al.

[11] 4,431,484
[45] Feb. 14, 1984

[54] HEATING SYSTEM FOR REGENERATIVE COKE OVEN BATTERIES

[75] Inventors: Heinrich Weber; Dieter Stalherm, both of Recklinghausen; Klaus Urbye, Flaesheim; Manfred Morgenstern, Recklinghausen, all of Fed. Rep. of Germany

[73] Assignee: Firma Carl Still GmbH & Co.KG, Fed. Rep. of Germany

[21] Appl. No.: 378,324

[22] Filed: May 14, 1982

[30] Foreign Application Priority Data

May 20, 1981 [DE] Fed. Rep. of Germany ....... 3119973

[51] Int. Cl.³ ...................... C10B 21/02; C10B 21/04; C10B 21/24
[52] U.S. Cl. ..................................... 202/141; 202/151
[58] Field of Search ............................... 202/141–144, 202/151

[56] References Cited

U.S. PATENT DOCUMENTS

| | | |
|---|---|---|
| 3,054,728 | 9/1962 | Schmidt et al. ...................... 202/151 |
| 3,366,372 | 1/1968 | Palumbo . |
| 3,567,588 | 3/1971 | Steding et al. ....................... 202/144 |
| 3,801,470 | 4/1974 | Knappstein et al. ................. 202/151 |
| 3,996,109 | 12/1976 | Pries .................................... 202/143 |
| 4,113,570 | 9/1978 | Pries .................................... 202/144 |
| 4,249,997 | 2/1981 | Schmitz ............................... 202/151 |

FOREIGN PATENT DOCUMENTS

| | | |
|---|---|---|
| 1118156 | 11/1961 | Fed. Rep. of Germany ...... 202/151 |
| 1796173 | 2/1962 | Fed. Rep. of Germany . |
| 360956 | 11/1931 | United Kingdom . |
| 490813 | 8/1938 | United Kingdom ................ 202/144 |

*Primary Examiner*—Bradley Garris
*Attorney, Agent, or Firm*—McGlew and Tuttle

[57] ABSTRACT

A heating system for regenerative coke oven batteries having a plurality of coke oven chambers separated by heating walls and a plurality of regenerators extending the length of the coke oven for preheating air and cooling hot waste gases comprises a plurality of spaced heating ducts extending upwardly in the heating walls which are grouped into two adjacent pairs of heating ducts. The ducts in each group of four heating ducts are separated by first and second binder walls with the first binder walls carrying one binder duct for supplying air and discharging hot waste to and from adjacent heat ducts in one of the pairs in the group. The second wall is either provided with no heating ducts or a pair of heating ducts. A horizontal channel connects the tops of all four heating ducts in each group and the lower end of each heating duct is provided with a rich gas supply nozzle.

10 Claims, 6 Drawing Figures

HEATING SYSTEM FOR REGENERATIVE COKE OVEN BATTERIES

FIELD AND BACKGROUND OF THE INVENTION

The invention relates in general to coke ovens and in particular to a new and useful heating system for regenerative coke oven batteries.

Heating systems for regenerative coke oven batteries are known which include regenerators for preheating air and cooling hot waste gases. Binder ducts in vertically spaced discharge slots are provided for supplying air to heating ducts in the regenerators. At least one rich gas supply nozzle in the lower portion of each heating duct is also provided.

The purpose of heating systems of this kind is particularly to obtain a uniform heating of coke ovens having very high oven chambers, such as those of six meters and more.

Aside from the usual regenerative, bisectional, stepwise heated compound coke ovens, a compound coke oven with twin heating ducts and a stepped supply of combustive gases to the heating ducts through binder ducts and discharge slots is known from German Pat. No. 17 96 173 to applicant, in which, for firing with rich gas only, each binder wall is provided with a binder duct, and, in a so-called compound coke oven, a double binder duct is provided in each of the binder walls. This means that in a compound coke oven for lean gas firing, two closely adjacent ducts are provided in each binder wall, through which either air against waste heat, or lean gas against waste heat is directed, which is particularly problematic.

It is further known, for example from the Ullmann Encyclopedia, Vol. 14, to provide, in a heating wall of a flow-control oven of the company Didier-Engineering, groups of two to four heating ducts. In such a case, four regenerator cells are associated with each heating wall, which communicate individually through a bottom duct with the oven head and, through separate ducts, with each of the firing locations in the heating ducts. Even though only two firing locations are provided, at different levels, this results in the necessity of having two lean gas conduits for a heating duct, at different levels. Consequently, with lean gas firing, this system requires four combustive gas supply conduits to each heating duct and four regenerator chambers.

Under certain conditions, for example, if basic repairs of existing coke oven batteries are provided, it may be considered advantageous to depart from the proven design of a stepwise heated compound oven, of the Still company, as far as the bisecting feature is concerned.

SUMMARY OF THE INVENTION

The present invention is directed to a novel heating system for regenerative coke ovens which insures uniform heating over the entire height of the chamber and avoids the drawbacks of other systems. At the same time, it is intended to reduce the number of conduits for supplying the heating ducts with combustive gases and, in general, to provide a heating wall which is simple in design, and requires less complicated brick shapes.

Accordingly, an object of the invention is to provide a heating system for a regenerative coke oven battery having a plurality of coke oven chambers separated by heating walls and a plurality of regenerators for preheating air and cooling hot waste gases, comprising: said heating walls having a plurality of spaced heating ducts extending upwardly therein; at least some of said heating ducts being grouped to groups of four heating ducts each with two adjacent pairs of adjacent heating ducts in each group; a first binder wall between adjacent heating ducts in each pair; a second binder wall between adjacent pairs of heating ducts; each first binder wall having a binder duct extending therein and connected with each adjacent heating duct by vertically spaced discharge slots, each binder duct connected to a regenerator; connection means connecting the tops of all heating ducts in each group; said first and second binder walls alternating along said heating wall; and at least one rich gas supply nozzle at a lower end of each heating duct; said regenerators extending across the entire length of said coke oven chambers.

Due to this combination, having the group of four ducts with a short horizontal connection above, and notwithstanding the rich gas supply nozzles in each heating duct below, a single binder duct is needed for every two heating ducts.

At the same time, the particularly satisfactory supply of preheated air through a plurality of vertically spaced discharge slots, known from the bisectional Still system, can be maintained, so that nothing interferes with the construction of particularly high heating walls. In addition, combustion gases of only two heating ducts now flow through the short upper connection of a groove, while in the prior art bisected oven, gases from about 14 heating ducts had to be directed in that way. The connection may thus be substantially narrower, or a substantial amount of power is saved due to the reduced pressure drop.

In addition to a firing with rich gas only, the invention also provides firing with rich gas and lean gas. Accordingly, another object of the invention is to provide a heating system for a regenerative coke oven battery wherein alternately among said first and second binder walls, each first binder wall is provided with one binder duct and each second binder wall is provided with two binder ducts, said two binder ducts connected individually to adjacent heating ducts over vertically spaced slots.

While disregarding the obligatory rich gas nozzles at the bottom of each heating duct, this system again has the advantage of requiring only three short connections or binder ducts for two heating ducts only in order to supply preheated air and lean gas from the two regenerators and to discharge the waste heat.

Unlike in a group flow control system, in this design, the number of binder slots and thus of the vertically spaced firing locations is independent of the number of associated regenerator chambers and connecting ducts. Also, this new construction does not require the expensive transverse regenerators for at least four successive heating walls, as needed in accordance with the above-mentioned German Pat. No. 17 96 173.

A further object of the invention is to provide such a heating system for heating with rich gas only wherein binder ducts are provided only in those binder walls by which two heating ducts for carrying gas in the same flow direction are separated from each other.

The two adjacent uptake heating ducts may thus neatly be separated from the two downtake ones by a simple, solid binder wall.

In the design for additional use of lean gas, it has proved advisable to provide single binder ducts in the first binder walls which extend between heating ducts which carry gas in the same flow direction and double binder ducts in the second binder walls. The binder walls containing the double binder ducts may then be made somewhat wider, thus more stable, at the expense of the walls therebetween.

To prevent any entrainment of unburned lean gas through leaks in the binder walls into the waste heat system, the invention further provides that lean gas is directed through the regenerators which are connected to the respective single binder ducts for each heating duct group.

The inventive heating system may also be applied to plants where the regenerators extend over the entire length of the coke ovens and are subdivided above their bottom ducts by partitions into sections. Accordingly, another object of the invention is to provide a heating system for a regenerative coke oven battery wherein the regenerators which extend over the entire length of the coke ovens are subdivided into sections with each section associated with a single group of four heating ducts, the length of each section being variable by partitions extending across the regenerators. Then, in an oven fired with rich gas only, the partition can be provided at different locations between the regenerator outlets leading to the binder ducts, depending on the heat exchange surface area required for the respective group of heating ducts. In a compound oven, however, the location of the partitions can be changed only if at the boundary of the two groups, the conduits from the binder ducts to the regenerators diverge obliquely downwardly.

It has proven to be particularly advantageous to provide sections which increase in length from the pusher side to the coke side. Since the oven chamber grows larger in that direction, a higher heat amount is needed for the carbonization at the coke side. This may be done by gradually increasing the heat exchange surface area, whereby the efficiency of the regenerator sections is augmented too. By distributing or collecting the individual gas streams from and to the individual sections in the common bottom duct, a satisfactory exchange surface area is obtained particularly in the head section at the coke side. This is not possible in a group flow control system comprising a plurality of supply ducts which are side by side and above one another, where the heat consumption is unnecessarily increased. In addition to the enlargement of the regenerator sections toward the coke side, it may be provided, in accordance with the invention, that the length of the runner stones, and thus the width of the heating ducts, increases in the same direction. This means at the same time that the spacing of the heating ducts increase from the pusher side to the coke side, which makes the location of the ducts better adjusted to the length of the regenerator sections.

To operate the individual regenerator sections more uniformly, the invention provides in addition that in adjacent heating walls on opposite sides of a coke oven chamber, groups of the heating ducts are connected to the same regenerator section and are operated in opposite flow directions. The favorable effect of this is that at one end of the regenerator section the first two heating ducts of one heating wall are connected, while at the other end of the section, the third and fourth heating ducts of the neighboring heating wall are connected. Thus, neither the supplied air, or air and lean gas in a compound oven, nor the waste heat are directed through the regenerator section unilaterally. Rather, their flow is uniformly distributed over the cross-section area of the section. The distribution of the gases at the grates supporting the checkerwork of a section is substantially facilitated by this inventive provision.

Since at the heads of a heating wall, thus at the pusher side and coke side, a special adjustment of the combustive gases is always needed, the invention provides that adjusting slides which are accessible from outside the coke oven battery are provided in inlets from the regenerator checkerwork to the binder ducts. These inventive adjusting slides at the inlets of the first two pairs of heating ducts of the two associated heating walls may be actuated through the inspection holes which are anyway provided in the outside wall of the regenerator above the checkerwork, in a simple way, for example by means of an iron rod. The inventive system may be applied to both sideburner and underburner type rich-gas firing. With sideburners, the two needed rich gas conduits are advantageously provided side by side. The rich gas nozzles of the heating ducts of identical flow direction are connected to one of these rich gas conduits, and the rich gas nozzles of the other two heating ducts are connected to the adjacent rich gas conduit. Advantageously, the rich gas nozzles are located asymmetrically in the respective heating ducts to save space for a vertical outlet into the subjacent rich gas conduit, which may then be cleaned from the oven roof.

Unlike a group flow control oven system, the inventive system makes it possible to discharge the waste heat, i.e. flue gases, unilaterally into a waste heat duct at the pusher side or the coke side, or to discharge them both to the pusher and the coke sides. The same of course applies to the supply of combustion air or lean gas. In a group flow control system, on the contrary, because of the large number of regenerator bottom ducts, only a bilateral supply and discharge of the combustive gases is provided. If a bilateral flue gas discharge and air supply are provided, i.e. if the oven is bisected, the central wall may be provided centrally, or, for example four groups may be provided at the pusher side and three groups at the coke side, depending on the number of groups of four. This makes it possible, primarily, to separately operate the regenerator sections associated with the groups of four at the heads at the pusher and coke sides, by providing separate inlets in the waste heat valves in a similar way as in a flow control oven. The inventive system has the particular advantage than an equal height of the checkerwork may be provided over th entire length of the regenerators. In connection with the direct association of the gas amounts to be preheated with the waste heat of a group of four, this results in a particularly favorable thermal capacity ratio w/w'. The unit capacity factor resulting therefrom is considerably more favorable than in other systems. Should a predetermined chamber length fail to be divisible by four, because of the maximum possible spacing between the heating ducts, it is possible, in accordance with the invention, to provide a combination of groups of four with groups of two or three heating ducts at the heads of the heating wall. The following structural variants are possible in such cases:

1. Heating System With Rich Gas Only:

a. A twin heating duct is provided at the heating wall heads, in addition to the groups of four. The combustion air is supplied at the bottom of the first heating duct, at the same level as the rich gas, and the waste heat is discharged from the second heating duct through the vertically spaced slots and through the binder duct which extends between the first and second heating ducts. After reversal, the combustion air is supplied at the respective spaced levels into the second heating duct and the waste heat is discharged at the bottom of the first heating duct into the first regenerator section.

b. With a so-called triple heating group associated with groups of four heating ducts, air and gas are advantageously supplied in the first heating duct, as in a, and the flow gas is to be discharged from the two other heating ducts in the same way as in the groups of four. After reversal, the air is again supplied at spaced levels to the second and third heating ducts as in the groups of four, and the waste heat is discharged from the first heating duct.

2. Compound Oven Heatable with Lean Gas:

a. As in 1a, an additional twin heating duct is supplied at the bottom with lean gas, in addition to air. The other heating duct is designed regularly as the third or fourth heating duct of a group of four.

b. With a triple heating duct group, in contradistinction to 2a, an intermediate third heating duct is provided with conventional binder ducts.

To obtain uniform amounts of gas with these odd groups, it may even be advantageous to provide a combination of five heating ducts.

A further object of the invention is to provide a heating system for regenerative coke oven batteries which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the following, the invention is explained in more detail with reference to the drawings in which.

DESCRIPTION OF THE PREFERRED EMBODIMENTS

In FIGS. 1-6, the flow directions of the combustive gases are shown for a single heating state. Upon reversal of the heating, these flow directions are changed everywhere to the opposite directions.

Figure 1:
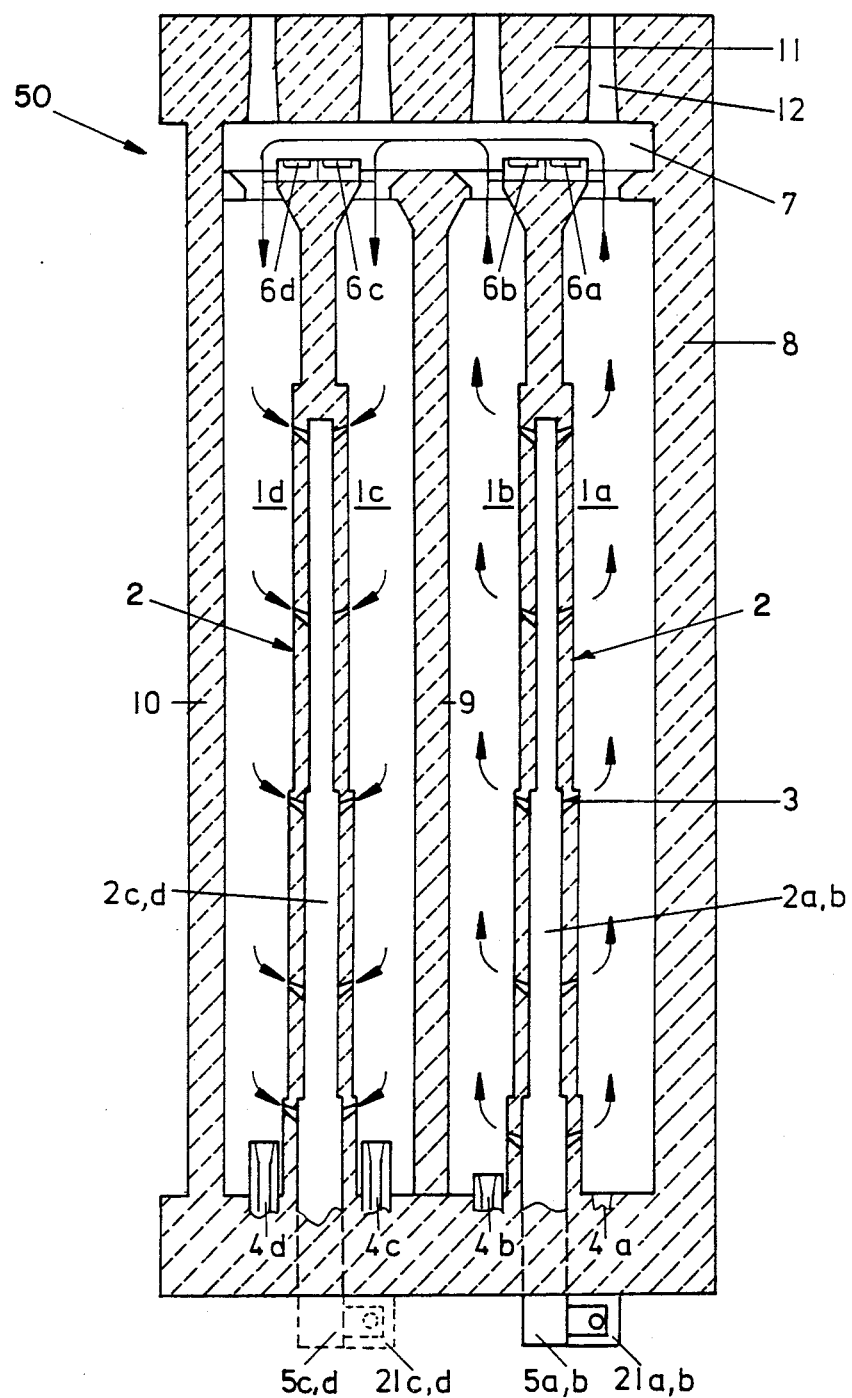
FIG. 1 is a side sectional view which shows a group of four heating ducts, forming part of a heating wall for rich-gas firing only according to the invention.
Figure 2:
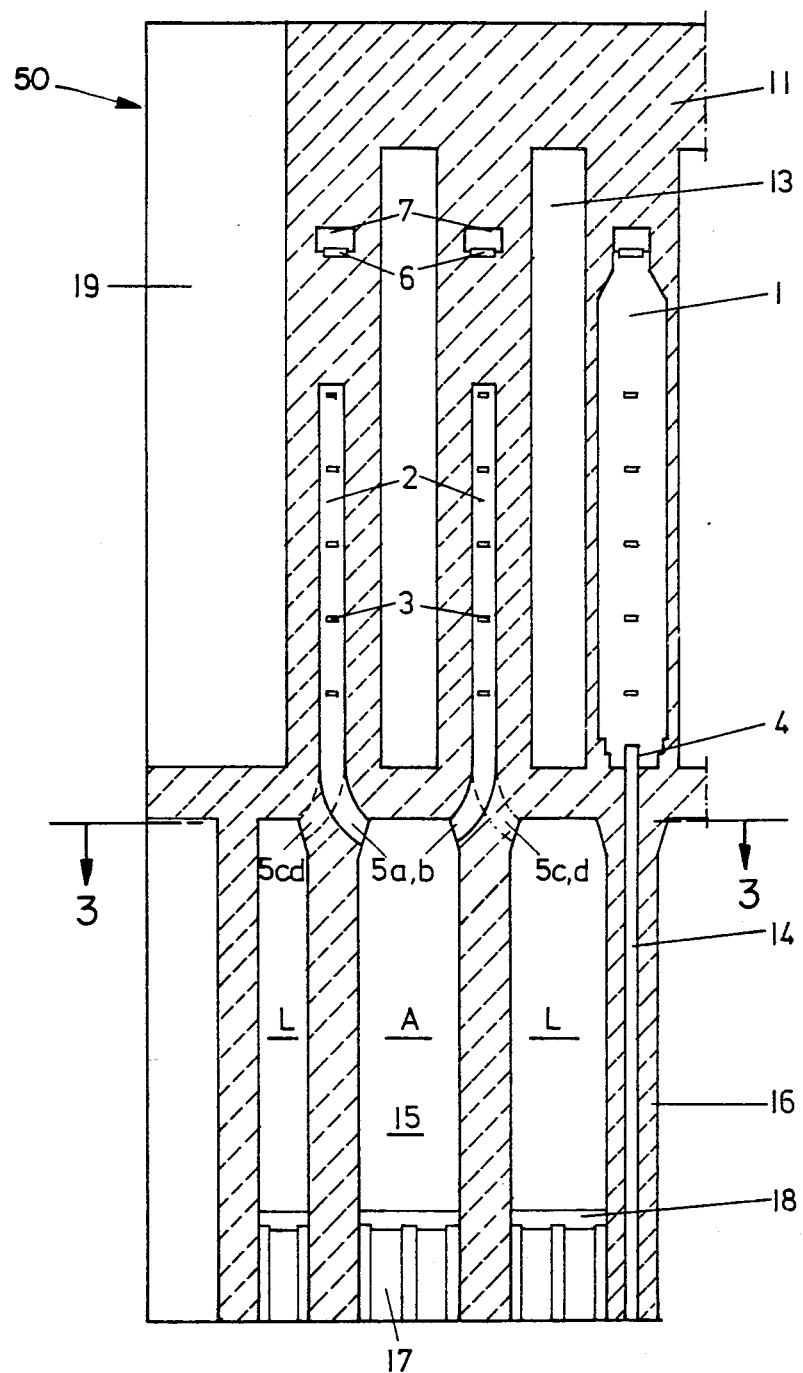
FIG. 2 is a side view which is taken perpendicularly to FIG. 1 also showing the regenerators below the coke oven chambers.

According to FIG. 1, the combustion air which is preheated in the regenerators, is supplied through an inlet 5a, b and in an amount which can be adjusted by a slide 21a, b for the group of four heating ducts 1a, 1b, 1c and 1d, at the head of the oven battery generally designated 50. Inlet 5a, b opens into a binder duct 2a, b wherefrom it passes through discharge slots 3, which are provided at spaced levels, into two of the heating ducts 1a and 1b. With an underburner firing, the rich gas may be supplied through risers 14 (FIG. 2) and nozzles 4a, 4b into these two heating ducts. The combustion gases escape at the upper end of the heating ducts and flow through a horizontal upper duct 7, and are deflected downwardly through the two other heating ducts 1c, 1d wherefrom they flow through the discharge slots and a binder duct 2c, d to the regenerators. The binder ducts are provided in first binder walls 2. FIG. 2 shows that only one regenerator 15 is provided below each oven chamber 13, with connections 5 being provided to each of the two heating walls 20 bounding an oven chamber 13. In the longitudinal direction of the battery, alternately regenerators for air L and waste heat A are provided. The four heating ducts 1a to 1d thus from a single heating group. It is noted that the binder ducts 2a, b are stepped down in width a plurality of times as the ducts rise in the first binder wall, as in the wall itself.

Figure 3:
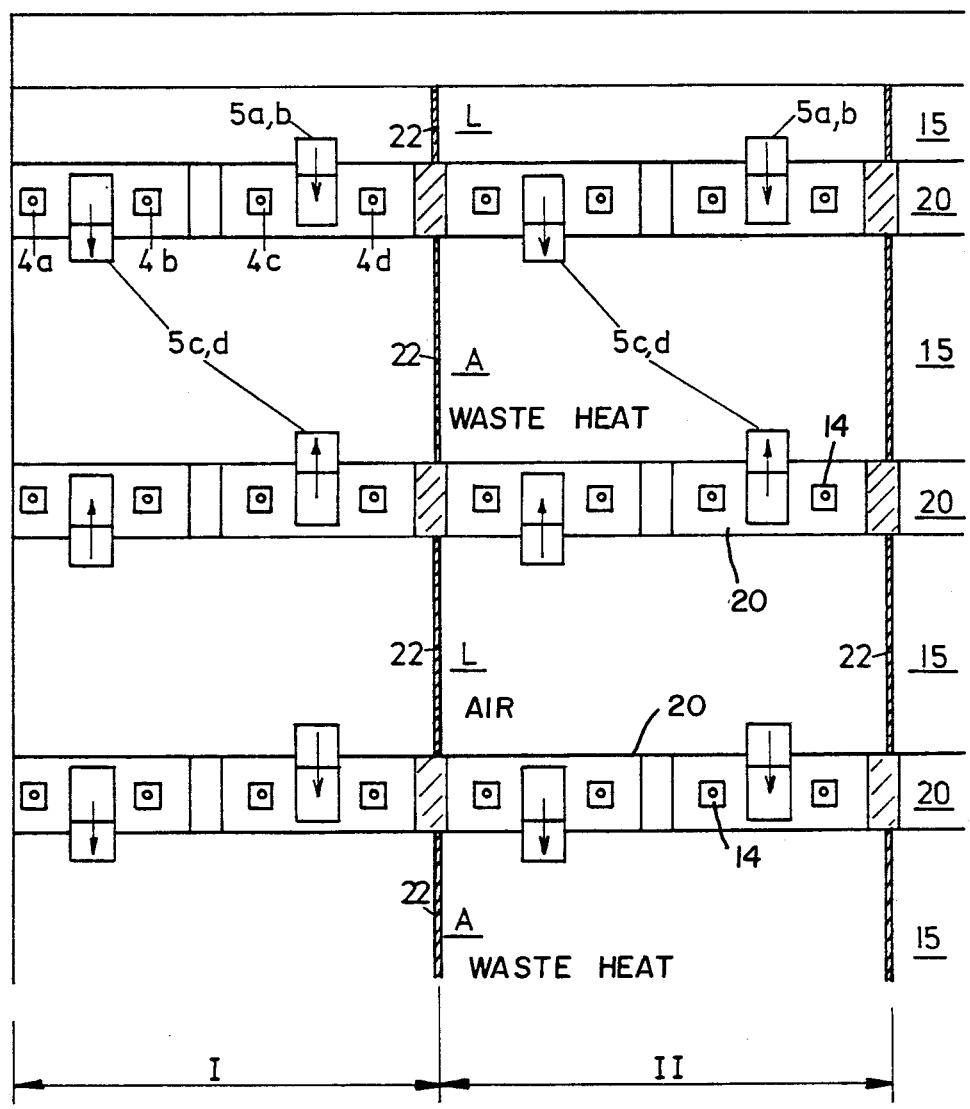
FIG. 3 is a top horizontal sectional view showing a plurality of heating walls and diagrammatically showing the supply conduits to the individual heating ducts of a rich-gas fired oven taken at a plane below the coke oven chambers.

In FIG. 3, the association of regenerator sections with groups I,II of four heating ducts each, and each having different heating walls 20, is diagrammatically shown. It may be seen in FIG. 3 that the waste heat outlets 5c, d leading into a regenerator section are provided at diametrally opposite locations. The air inlets 5a, b are arranged in the same manner. In the shown embodiment, the regenerator partitions 22 are provided exactly in the transition line between heating duct groups I and II. These partitions 22 might be displaced to another location between inlet 5a, b and next outlet 5c, d to adjust another length of the respective section.

FIGS. 1-3 show a rich gas heating system in which every four subsequent heating ducts are combined into a group and combustion air is supplied to the respective two adjacent ducts of the group through a single binder duct and a plurality of discharge slots. This design leads to a very simple construction of coke oven batteries, in which the temperature is distributed with an extraordinary uniformity in the horizontal and particularly also in the vertical direction, even if very high heating walls are provided.

Figure 5:
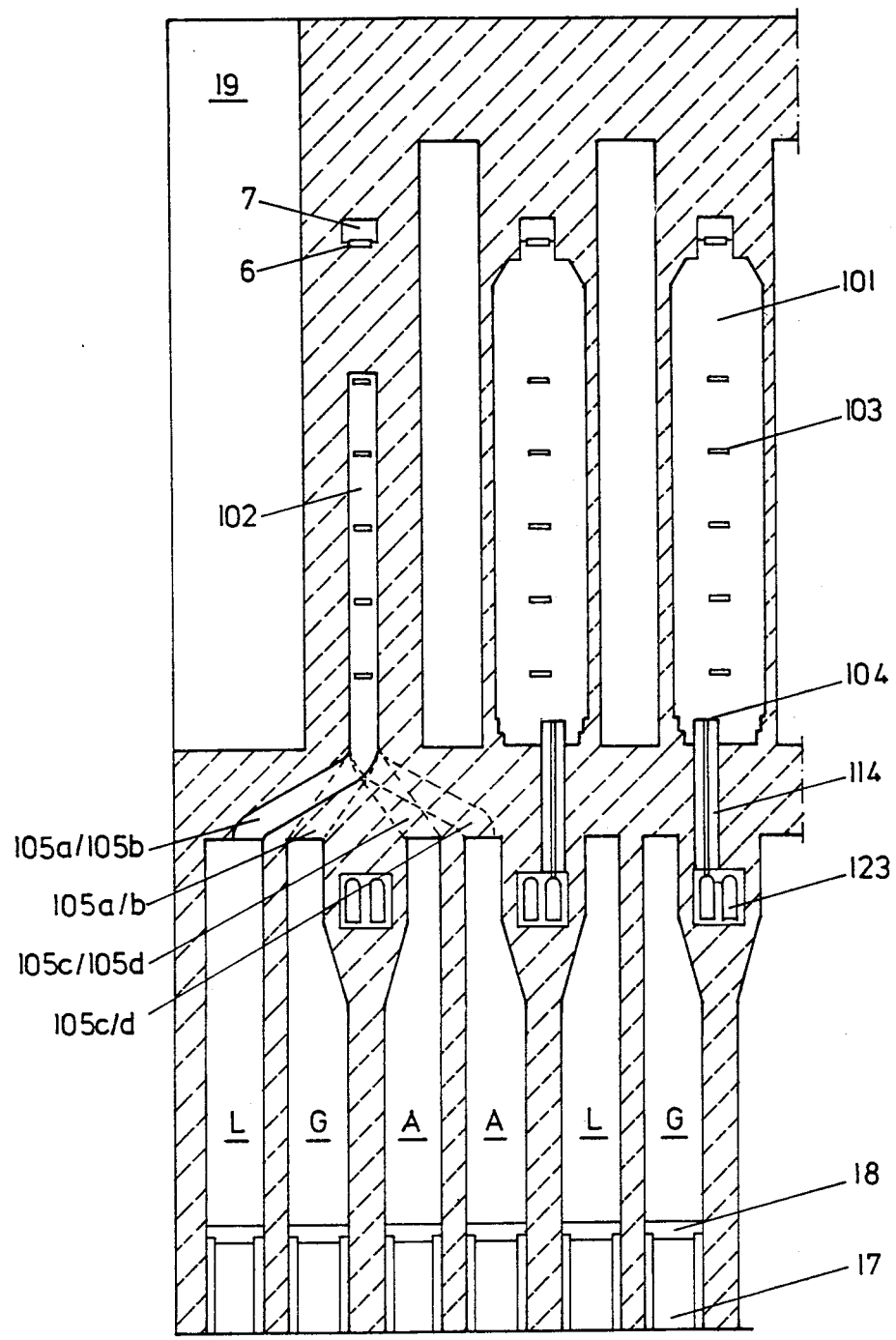

In a compound oven, which is designed for both rich gas and lean gas firing, the heating wall comprises alternately binder walls with a single duct, and such wall with a double duct or two ducts. The head masonry also encloses a heating duct which, however, is shorter than the ordinary ones. As compared to a rich gas oven having a single regenerator chamber associated with each heating wall, in a compound oven, four regenerative chambers for air, gas and waste heat, are associated with each heating wall (see FIG. 5). Since each regenerator chamber has two outlets, however, only two regenerator chambers are provided for each heating wall. FIG. 5 further shows two adjacent rich gas ducts 123 in the upper part of the supporting wall of the regenerator, wherefrom vertical connections 114 lead to rich gas nozzles 104 at the bottom of the heating ducts.

Figure 6:
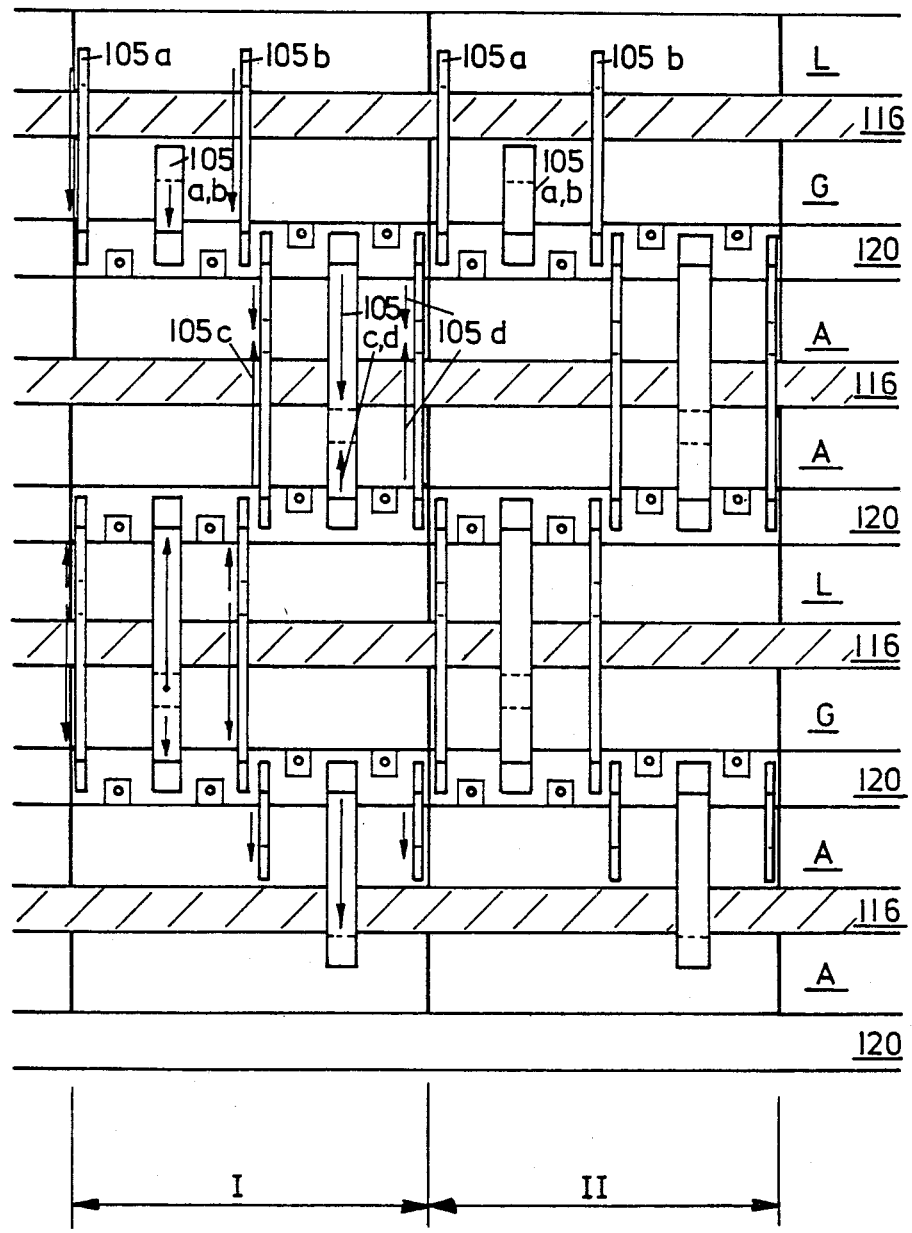

The operation of the compound oven heating system is illustrated particularly in FIG. 6. In contradistinction to FIG. 3, the connections for air, lean gas, and waste heat of FIG. 6 are all provided at one end of the regenerator section. They may also be located symmetrically, however. In FIGS. 1 to 3 reference numeral designations are as follows:

1a to 1d; heating ducts forming the group of four ducts;

2; first binder walls;
2a to 2d; binder ducts in binder walls, between every two heating ducts of identical flow direction;
3: discharge slots;
4a to 4d: rich gas nozzles;
5a to 5d: supply ducts from regenerators to binder ducts 2a to 2d;
6a to 6d: slide bricks at the upper end of heating ducts 1a to 1d;
7: upper horizontal duct of a group of four;
8: partition wall at the head of the oven;
9, 10: second binder wall between heating duct pairs 1a,b and c,d;
11: oven roof;
12: inspection holes;
13: coke oven chamber;
14: rich gas supply riser in regenerator supporting walls 16;
15: regenerators;
16: regenerator supporting walls;
17: ducts at the regenerator bottom;
18: supporting grates for the regenerator checkerwork;
19: lining wall of the battery head;
20: heating wall;
21a to 21d: adjusting slides at the lower end of supply ducts 5;
22: regenerator partitions;
A: Waste heat; and
L: Air.

Figure 4:
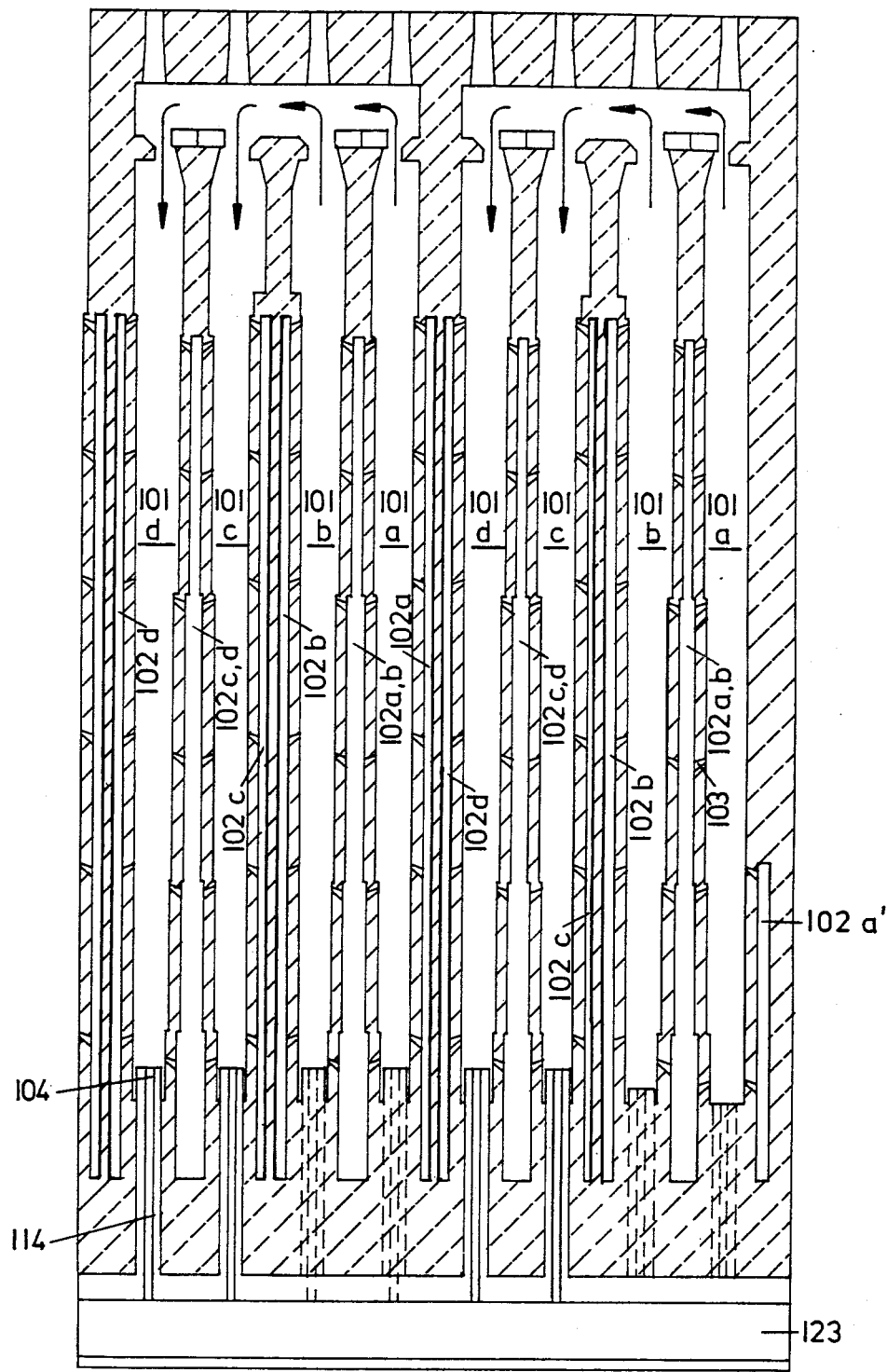
FIGS. 4-6 are showings corresponding to FIGS. 1-3 respectively, but relating to a compound coke oven which is heatable, in addition, with lean gas.

In FIGS. 4 to 6 reference numeral designations are as follows:
101a to 101d: heating ducts;
102: binder ducts;
  102a: for air at the oven head;
  102a, b: for lean gas;
  102b: for air;
  102c, 102c,d and 102d: for waste heat; and after reversal of the heating cycle
  102d, 102c: for air;
  102c,d: for lean gas;
103: discharge slots;
104: rich gas nozzles;
105a to 105d supply connections to the corresponding binder ducts 102a to 102d;
114: connection from rich gas duct to the nozzle;
116: regenerator supporting walls along the oven;
120: heating wall;
123: horizontal rich gas duct; and
G: lean gas regenerator.

Thus, according to the invention, the plurality of spaced heating ducts which extend upwardly through the heating walls on opposite sides of a coke oven chamber are grouped into groups of four ducts comprising two adjacent pairs of adjacent ducts. The two pairs are separated by first and second binder walls 2 and 9 respectively. Each pair of heating ducts is supplied by its own binder duct which extends in the first binder walls. The first and second binder walls alternate as shown in FIGS. 1 to 3. As shown in FIGS. 4 through 6, two binder ducts are provided in first binder walls while two ducts are provided in second binder walls. By this arrangement, pairs of heating ducts which carry flow in a common direction are serviced by one binder duct and adjacent pairs of heating ducts for carrying flow in opposite directions are serviced by one each of the heating ducts in the second binder walls.

While specific embodiments of the invention have been shown and described in detail to illustrate the application of the principles of the invention, it will be understood that the invention may be embodied otherwise without departing from such principles.

What is claimed is:

1. A heating system for a regenerative coke oven battery having a plurality of coke oven chambers separated by heating walls and a plurality of regenerators for preheating air and cooling hot waste gases, comprising:
said heating walls having a plurality of spaced heating doors extending upwardly therein and each regenerator extending across an entire length of each coke oven chamber;
said heating ducts of one heating wall grouped into groups of four heating ducts each with two adjacent pairs of adjacent heating ducts in each group;
a first binder wall between adjacent ducts in each pair, said first binder wall extending transversely to the length of each coke oven chamber and having a width which is stepped down a plurality of times in the direction of the length of each coke oven chamber from a bottom to a top of said first binder wall;
a second binder wall between adjacent pairs of heating ducts extending transversely of the length of each coke oven chamber;
each first binder wall having a binder duct extending therein and connected with each adjacent heating duct by vertically spaced discharge slots so that gas flows in the same direction in each adjacent heating duct of each pair and in opposite directions in the two adjacent pairs, each binder duct being connected to a regenerator and being stepped down in width a plurality of times in the direction of the length of each coke oven chamber from a bottom to a top of each binder duct;
connection means connecting the tops of the four heating ducts in each group over an upper horizontal four flue duct extending in the length direction of each coke oven chamber;
said first and second binder walls alternating along said heating wall; and
at least one rich gas supply nozzle at a lower end of each heating duct;
said binder ducts being provided only in those first binder walls by which two adjacent heating ducts having a flow of gas in the same direction are separated.

2. A heating system according to claim 1, including a pair of further binder ducts extending in each of said second binder walls, each of said pair of further binder ducts connected to one adjacent heating duct, so that said heating ducts connected to each respective one of said first mentioned binder ducts in said first binder wall carry a flow of gas in the same direction and each of said pair of further binder ducts is connected to an adjacent heating duct for carrying gas in opposite directions.

3. A heating system according to claim 2, including regenerators through which lean gas is to be directed, each regenerator through which lean gas is to be directed connected to said first mentioned binder ducts in said first binder wall.

4. A heating system according to claim 1, including bottom ducts for said regenerators, partition means subdividing said regenerators into sections, said partition means positioned above said bottom ducts, each regenerator section connected to one group of four heating ducts each.

5. A heating system according to claim 4, wherein said partition means are adjustable in position for varying the length of each regenerator section.

6. A heating system according to claim 5, wherein said partition means are positioned so that the length of each regenerator section is increased from a pusher side to a coke side of the coke oven battery.

7. A heating system according to claim 5, wherein said heating walls are made of runner stones, the length of said runner stones increasing in size from a pusher side to a coke side of the coke oven battery so that said heating ducts also increase in the size in the direction from the pusher side to the coke side.

8. A heating system according to claim 1, wherein, in heating walls on opposite sides of a common coke oven chamber, said groups of four heating ducts are connected to a common regenerator for operation in opposite flow directions.

9. A heating system according to claim 1, including an inlet connected between each regenerator and a connected binder duct, including an adjusting slide provided in each inlet which is accessible from outside the coke oven battery.

10. A heating system according to claim 1, wherein the groups of four heating ducts in adjacent heating walls on opposite sides of a coke oven chamber are positioned so that gas flows in opposite direction.

* * * * *